United States Patent
Eoff et al.

(10) Patent No.: US 8,343,896 B2
(45) Date of Patent: Jan. 1, 2013

(54) SEALANT COMPOSITIONS COMPRISING DIUTAN AND ASSOCIATED METHODS

(75) Inventors: Larry S. Eoff, Duncan, OK (US); Richard W. Pauls, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 143 days.

(21) Appl. No.: 12/570,057

(22) Filed: Sep. 30, 2009

(65) Prior Publication Data

US 2010/0036017 A1 Feb. 11, 2010

Related U.S. Application Data

(63) Continuation-in-part of application No. 11/335,134, filed on Jan. 19, 2006, which is a continuation-in-part of application No. 11/041,577, filed on Jan. 24, 2005, now Pat. No. 7,267,174, and a continuation-in-part of application No. 11/041,554, filed on Jan. 24, 2005, now abandoned.

(51) Int. Cl.
*C09K 8/44* (2006.01)

(52) U.S. Cl. ........ 507/211; 507/214; 507/219; 507/221; 507/222; 507/223; 507/224; 507/225; 507/229; 507/269; 507/271; 166/295; 166/305.1; 523/130

(58) Field of Classification Search .......... None
See application file for complete search history.

(56) References Cited

U.S. PATENT DOCUMENTS

| 3,417,017 A | * | 12/1968 | Kolaian et al. | 507/111 |
| 3,493,561 A | * | 2/1970 | Park et al. | 536/105 |
| 4,629,747 A | | 12/1986 | Wu et al. | |
| 4,683,949 A | | 8/1987 | Sydansk et al. | |
| 4,935,060 A | * | 6/1990 | Dingsoyr | 106/719 |
| 5,134,118 A | * | 7/1992 | Patel et al. | 507/121 |
| 5,175,278 A | | 12/1992 | Peik et al. | |
| 5,335,726 A | | 8/1994 | Rodrigues | |
| 5,337,824 A | * | 8/1994 | Cowan | 166/293 |
| 5,339,903 A | * | 8/1994 | Eoff et al. | 166/293 |
| 5,340,860 A | | 8/1994 | Brake et al. | |
| 5,358,044 A | * | 10/1994 | Hale et al. | 166/293 |
| 5,358,051 A | | 10/1994 | Rodrigues | |
| 5,588,488 A | | 12/1996 | Vijn et al. | |
| 5,688,844 A | * | 11/1997 | Chatterji et al. | 524/8 |
| 5,836,392 A | | 11/1998 | Urlwin-Smith | |

(Continued)

FOREIGN PATENT DOCUMENTS

EP 0566118 4/1993

(Continued)

OTHER PUBLICATIONS

Navarrete et al., New Bio-Polymers for Drilling, Drill-in, Completions, Spacer Fluids and Coiled Tubing Applications; IADC/SPE 62790, XP-002607369, 2000.

(Continued)

*Primary Examiner* — John J Figueroa
(74) *Attorney, Agent, or Firm* — Robert A. Kent; McDermott, Will & Emery LLP

(57) ABSTRACT

Methods are provided comprising providing a sealant composition comprising an aqueous fluid, a diutan composition, at least one gel system, and a leak off prevention material; introducing the sealant composition into a well bore penetrating the subterranean formation; and allowing the sealant composition to form a seal.

20 Claims, 3 Drawing Sheets

U.S. PATENT DOCUMENTS

| | | | |
|---|---|---|---|
| 6,176,315 B1 | 1/2001 | Reddy et al. | |
| 6,180,571 B1 * | 1/2001 | Sifferman et al. | 507/110 |
| 6,182,758 B1 | 2/2001 | Vijn | |
| 6,187,839 B1 | 2/2001 | Eoff et al. | |
| 6,192,986 B1 * | 2/2001 | Urlwin-Smith | 166/295 |
| 6,196,317 B1 | 3/2001 | Hardy | |
| 6,607,035 B1 | 8/2003 | Reddy et al. | |
| 6,626,992 B2 | 9/2003 | Vijn et al. | |
| 6,764,981 B1 | 7/2004 | Eoff et al. | |
| 6,838,417 B2 | 1/2005 | Bouwmeester et al. | |
| 6,843,841 B2 | 1/2005 | Reddy et al. | |
| 6,875,729 B2 | 4/2005 | Verlaan et al. | |
| 6,936,574 B2 | 8/2005 | Dao et al. | |
| 7,007,752 B2 | 3/2006 | Reddy et al. | |
| 7,091,160 B2 | 8/2006 | Dao et al. | |
| 7,128,148 B2 | 10/2006 | Eoff et al. | |
| 7,322,414 B2 | 1/2008 | Reddy et al. | |
| 7,331,390 B2 | 2/2008 | Eoff et al. | |
| 2003/0060374 A1 * | 3/2003 | Cooke, Jr. | 507/200 |
| 2003/0213593 A1 | 11/2003 | Bouwmeester et al. | |
| 2004/0177964 A1 * | 9/2004 | Girgenti | 166/294 |
| 2005/0261138 A1 * | 11/2005 | Robb et al. | 507/209 |
| 2006/0084580 A1 | 4/2006 | Santra et al. | |
| 2006/0086501 A1 | 4/2006 | Creel et al. | |
| 2006/0121578 A1 | 6/2006 | Bower et al. | |
| 2006/0199201 A1 | 9/2006 | Harding et al. | |
| 2006/0293446 A1 | 12/2006 | Reddy et al. | |

FOREIGN PATENT DOCUMENTS

| | | |
|---|---|---|
| EP | 1 457 639 A1 | 9/2004 |
| WO | WO 2006/077374 | 7/2006 |
| WO | WO 2007/085983 A1 | 8/2007 |
| WO | WO 2008/096165 A1 | 8/2008 |

OTHER PUBLICATIONS

International Search Report and Written Opinion for PCT/US2010/050902 dated Nov. 10, 2010.

Office Action for U.S. Appl. No. 11/335,134 dated Dec. 23, 2010.

Notification of Publication for International Application No. PCT/US2010/050902 dated Apr. 7, 2011.

Diltz et al., "Location of O-acetyl Groups in S-657 Using the Reductive-Cleavage Method," Carbohydrate Research, vol. 331, pp. 265-270 (2001).

Baroid, a Halliburton PSL, "Diamond Seal" Jun. 2001.

Kelco Oil Field Group, A Huber Company, "GEOVIS XT," Sep. 2005.

Halliburton brochure entitled "Cementing Halad®-344, Fluid Loss Additive," H01331, Aug. 2007.

Halliburton brochure entitled "Cementing SSA-1™ Strength-Stabilizing Agent," H01340, Aug. 2007.

Baroid Fluid Services, Halliburton, N-DRIL™ HT PLUS, Mar. 4, 2008.

Halliburton brochure entitled "Stimulation PermSeal® Service, Versatile, Csot-Effective Sealants for Conformance Applications," H02857, Feb. 2009.

Halliburton brochure entitled "Stimulation H2Zero™ Service, Cost-Effective Conformance Control," H00216R, Apr. 2008.

Vanson HaloSource, Chitosan Lactate, Date : Sep. 25, 2008.

* cited by examiner

SEALANT COMPOSITIONS COMPRISING DIUTAN AND ASSOCIATED METHODS

CROSS-REFERENCE TO RELATED APPLICATIONS

This application is a continuation-in-part of copending U.S. patent application Ser. No. 11/335,134 filed Jan. 19, 2006 entitled "A Sealant Composition Comprising a Gel System and a Reduced Amount of Cement for a Permeable Zone Downhole," which is a continuation-in-part of Ser. No. 11/041,577, filed Jan. 24, 2005, now U.S. Pat. No. 7,267,174 entitled "Methods of Plugging a Permeable Zone Downhole Using a Sealant Composition Comprising a Crosslinkable Material and a Reduced Amount of Cement" and U.S. patent application Ser. No. 11/041,554 filed Jan. 24, 2005 now abandoned entitled "A Sealant Composition Comprising a Crosslinkable Material and a Reduced Amount of Cement for a Permeable Zone Downhole," which are incorporated herein by reference in their entirety.

BACKGROUND

The present invention relates to sealant compositions comprising diutan, and more particularly, the present invention relates to sealant compositions comprising diutan and methods for using such sealant compositions in subterranean operations to form a seal in a subterranean formation.

The production of water with hydrocarbons from subterranean formations can present a major problem and expense in the production of the hydrocarbons. While hydrocarbon-producing wells are usually completed in hydrocarbon-bearing formations, such formations may contain, or may be adjacent to, water-bearing portions. The term "water-bearing portion" is defined herein to include any portion of a subterranean formation that may produce water, including a hydrocarbon-bearing portion that has sufficiently high water saturation such that water may be produced along with hydrocarbons. Although efforts generally are made to locate and avoid such water-bearing portions in drilling subterranean well bores, a well bore may penetrate a water-bearing portion of the formation accidentally (e.g., where a water-bearing portion was not detected prior to drilling the well bore). Moreover, the high mobility of the water may allow it to flow into the well bore by way of natural fractures and/or high permeability streaks present in the formation. Over the life of such wells, the ratio of water to hydrocarbons recovered may be undesirable in view of the cost of producing the water, separating it from the hydrocarbons, and disposing of it, which can represent a significant economic loss.

A variety of techniques have been used to reduce the production of undesired water. Generally, these techniques involve the placement of a material in a well bore penetrating a water-bearing portion of a subterranean formation that may prevent or control the flow of water into the well bore. These materials are referred to herein as "conformance materials." The techniques used to place these conformance materials are referred to herein as "conformance techniques" or "conformance treatments." Some techniques involve the injection of particulates, foams, gels, sealants, or blocking polymers into the subterranean formation so as to plug off the water-bearing portions. For example, squeeze cementing techniques may be used wherein a cement slurry is forced with pressure into a void or channel through which water would otherwise flow into the well bore, and the cement is allowed to set and seal off that channel. In other techniques, polymers referred to as "relative permeability modifiers" recently have been used, in some instances, to decrease the production of water with hydrocarbons.

SUMMARY

The present invention relates to sealant compositions comprising diutan, and more particularly, the present invention relates to sealant compositions comprising diutan and methods for using such sealant compositions in subterranean operations to form a seal in a subterranean formation.

In an embodiment, the present invention provides a method comprising providing a sealant composition comprising an aqueous fluid, a diutan composition, at least one gel system, and a leak off prevention material; introducing the sealant composition into a well bore penetrating the subterranean formation; and allowing the sealant composition to form a seal.

In an embodiment, the present invention provides a method comprising providing a sealant composition comprising an aqueous fluid, a diutan composition, at least one gel system comprising a polyethylene imine cross-linking agent, and a leak off prevention material; introducing the sealant composition into a well bore penetrating the subterranean formation; and allowing the sealant composition to form a seal.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
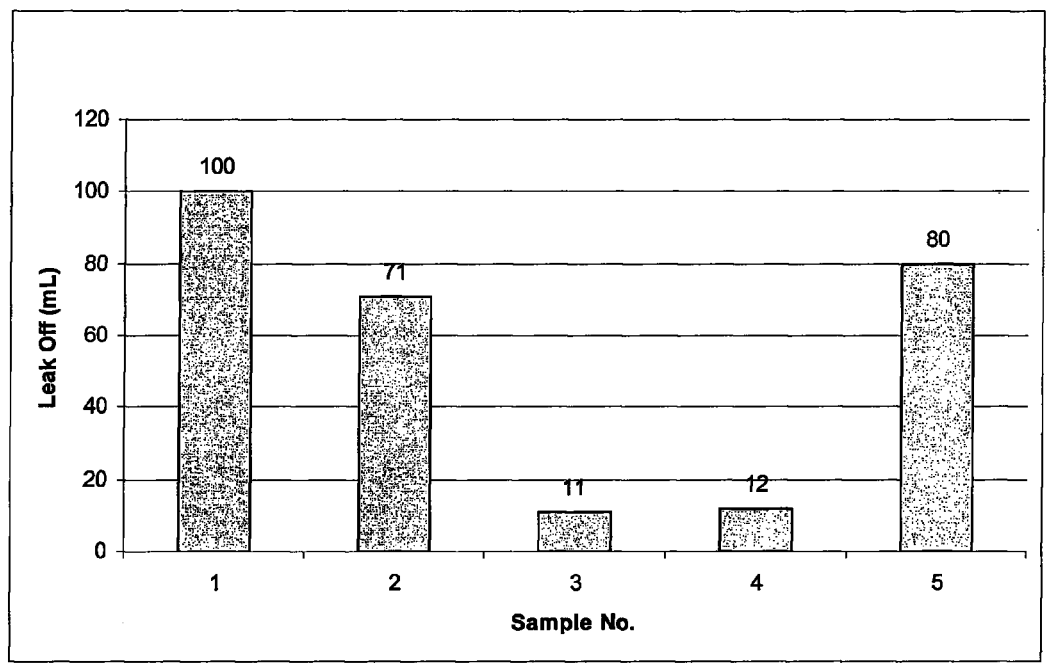
FIG. 1 is a graph of data discussed in the Examples section.

The present invention relates to sealant compositions comprising diutan, and more particularly, the present invention relates to sealant compositions comprising diutan and methods for using such sealant compositions in subterranean operations to form a seal in a subterranean formation.

The sealant compositions of the present invention generally comprise an aqueous fluid, a diutan composition, one or more gel systems, and a leak off prevention material (LPM). In some embodiments, the sealant compositions may further comprise a fluid loss control additive. One of the many potential advantages of the methods and compositions of the present invention is that the presence of a diutan composition in the sealing compositions of the present invention may allow, inter alia, for increased fluid loss control. Additionally, it is believed that the use of a diutan composition in combination with one or more of the gel systems disclosed herein produces a desirable result, e.g., a synergistic effect. As a result, in some embodiments, it may be possible to utilize less amounts of LPM and/or fluid loss control additives in the sealing compositions of the present invention, while still achieving effective levels of fluid loss control.

A. Suitable Diutan Compositions

As mentioned above, the sealant compositions of the present invention comprise a diutan composition. The diutan compositions suitable for use in the present composition may comprise nonclarified diutan, clarified diutan, and any combination or derivative thereof. The term "clarified diutan" as used herein refers to a diutan that has improved turbidity and/or filtration properties as compared to nonclarified diutan. In general, diutan is a polysaccharide, which may be prepared by fermentation of a strain of *sphingomonas*. Diutan may also be referred to as a polysaccharide designated S-657 and/or S-8 in some literature. Its structure has been elucidated as having a repeat unit of a hexasaccharide with a tetrasaccharide repeat unit in the backbone that comprises glucose and rhamnose units and a dirhamnose side chain. Details of the diutan gum structure may be found in an article by Diltz et al., "Location of O-acetyl Groups in S-657 Using the Reductive-Cleavage Method," CARBOHYDRATE RESEARCH, Vol. 331, p. 265-270 (2001). Details of preparing diutan gum may be found in U.S. Pat. No. 5,175,278, which is hereby incorporated by reference in its entirety.

In some embodiments, a diutan composition suitable for use in the sealant compositions of the present invention may comprise a clarified diutan that has been treated with enzymes or the like to remove residual cellular structures, such as cell walls. In some embodiments, suitable diutan compositions may be produced from genetically modified or bioengineered strains of bacteria or other strains of bacteria that allow the diutan composition to have improved functional properties such as filterability, turbidity, etc. In one embodiment, the diutan composition may be modified by genetic engineering or bacteria selection or the result of chemical treatment or derivatization of a diutan. An example of such a modification would be where a portion of the diutan is oxidized or hydrolyzed. Suitable diutan compositions may also be present in a form that will only partially hydrate or will not hydrate at ambient temperature. This form of clarified diutan may be chemically modified, chemically coated, genetically modified, or produced from a new strain of bacteria. A suitable source of a diutan composition is "GEOVIS XT," which is commercially available from Kelco Oil Field Group, Houston, Tex. Another suitable source of a diutan composition is "FDP-S848-07" and "FDP-S849-07," both of which are clarified diutans available from Halliburton Energy Services, Duncan, Okla. Other examples of suitable sources of diutan compositions may include those disclosed in U.S. Patent Publication Nos. 2006/0121578 and 2006/0199201, the relevant disclosures of which are herein incorporated by reference.

The diutan composition may be provided in any form that is suitable for a sealant composition. In certain embodiments, the diutan composition may be provided as a liquid, gel, suspension, and/or solid additive that is admixed or incorporated into the sealant composition. The diutan composition may also be present in a solid particulate form of any size or shape. In some embodiments, the diutan composition should be present in a sealant composition of the present invention in an amount sufficient to suspend solid, particulate fluid loss control materials. More specifically, in some embodiments, the amount of diutan composition used in the sealant compositions of the present invention may vary from about 1 lb/1000 gallons to about 75 lb/1000 gallons.

B. Suitable Gel Systems

The gel systems suitable for use in the sealant compositions and methods of the present invention generally comprise any gel system that is capable of sealing the formation to at least partially block fluid flow. Generally, the gels systems suitable for use in the present invention are water soluble. In some embodiments, the gel system may comprise one or more crosslinkable materials; a high density aqueous salt solution, a water soluble polymerizable monomer, and a polymerization initiator; selected water soluble polymers and a cross-linking agent; an oxidized chitosan-based compound and a water-soluble compound having carbonyl groups; an amine-based polymer, a polysaccharide-based polymer, and an oxidizing agent; a chitosan, a polymer capable of reacting with chitosan, and a gelation retarding additive; a water-soluble polymer having acylated amine units; a water-soluble polymer comprising polymerized vinyl amine units and an organic compound capable of crosslinking with the vinyl amine units of the water-soluble polymer; a water-soluble salt and an activator; a synthetic hectorite clay gelling and thixotropy-imparting agent; an acrylamide polymer and a crosslinking agent; and. Each gel system will be discussed in further detail below. It is within the ability of one skilled in the art, with the benefit of this disclosure, to determine the type and amount of gel system to include in the sealant compositions of the present invention to achieve the desired results. Factors that may affect this decision include the temperature and permeability of the subterranean formation and whether the formation comprises vugs and/or fractures, etc.

1. Crosslinkable Materials

In an embodiment, the sealant composition may include a gel system comprising one or more crosslinkable materials. Examples of suitable crosslinkable materials include, but are not limited to, the following: (i) a water soluble copolymer of a non-acidic ethylenically unsaturated polar monomer and a copolymerizable ethylenically unsaturated ester; (ii) a terpolymer or tetrapolymer of an ethylenically unsaturated polar monomer, an ethylenically unsaturated ester, and a monomer selected from 2-acrylamido-2-methylpropane sulfonic acid, N-vinylpyrrolidone, or both; or (iii) combinations thereof. The copolymer preferably contains from one to three polar monomers and from one to three unsaturated esters. The sealant compositions may also include at least one crosslinking agent, which is herein defined as a material that is capable of crosslinking such polymers to form a gel. The crosslinking agent may be, for example, an organic crosslinking agent such as a polyalkyleneimine, a polyfunctional aliphatic amine such as polyalkylenepolyamine, an aralkylamine, a heteroaralkylamine, or combinations thereof. Examples of suitable polyalkyleneimines are polymerized ethyleneimine and propyleneimine. Examples of suitable polyalkylenepolyamines are polyethylene- and polypropylene-polyamines. The amount of the crosslinkable material present in the sealant composition may be in a range of from about 1% to about 10% by weight of the sealant composition. The amount of the crosslinking agent may be in a range of from about 0.1% to about 5% by weight of the sealant composition. Examples of suitable polymers and crosslinking agents can be found in U.S. Pat. Nos. 5,836,392, 6,192,986, and 6,196,317, each of which is incorporated by reference herein in its entirety. In an embodiment, the crosslinkable material is a copolymer of acrylamide and t-butyl acrylate, and the crosslinking agent is polyethylene imine. These materials are commercially available in a single $H_2ZERO$ service providing conformance control system sold by Halliburton Energy Services of Duncan, Okla.

In some embodiments, the ethylenically unsaturated esters used in the crosslinkable material may be formed from a hydroxyl compound and an ethylenically unsaturated carboxylic acid selected from the group consisting of acrylic, methacrylic, crotonic, and cinnamic acids. The ethylenically unsaturated group is preferably in the alpha-beta or beta-gamma position relative to the carboxyl group, but it may be at a further distance. In an embodiment, the hydroxyl compound is an alcohol generally represented by the formula ROH, wherein R is an alkyl, alkenyl, cycloalkyl, aryl, arylalkyl, aromatic, or heterocyclic group that may be substituted with one or more of a hydroxyl, ether, or thioether group. The substituent can be on the same carbon atom of the R group as is bonded to the hydroxyl group in the hydroxyl compound. The hydroxyl compound may be a primary, secondary, iso, or tertiary compound. In an embodiment, a tertiary carbon atom is bonded to the hydroxyl group, e.g., t-butyl and trityl. In a desirable embodiment, the ethylenically unsaturated ester is t-butyl acrylate.

In some embodiments, the non-acidic ethylenically unsaturated polar monomers used in the crosslinkable material can be amides, e.g., primary, secondary, and/or tertiary amides, of an unsaturated carboxylic acid. Such amides may be derived from ammonia, or a primary or secondary alkylamine, which may be optionally substituted by at least one hydroxyl group as in alkylol amides such as ethanolamides. Desirable examples of such carboxylic derived ethylenically unsaturated polar monomers are acrylamide, methacrylamide, and acrylic ethanol amide.

Additional examples of suitable crosslinkable materials include but are not limited to self-crosslinking, water-soluble, hydroxy unsaturated carbonyl monomers and water-soluble vinyl monomers. While not required, these monomers may optionally be used in combination with a suitable initiator such as an azo compound that is temperature activated over a range of temperatures. As used herein, an initiator is defined as a compound that is capable of forming free radicals that initiate polymerization of self-crosslinking monomers. Further, the vinyl monomers may also be used in combination with crosslinking agents such as multifunctional, vinyl monomers. The amount of the crosslinkable material present in the sealant composition may be in a range of from about 1% to about 20% by weight of the sealant composition. The amount of the crosslinking agent may be in a range of from about 0.05% to about 2% by weight of the sealant composition.

Suitable hydroxy unsaturated carbonyls are generally represented by the formula:

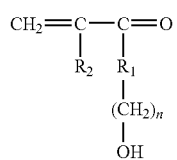

wherein $R_1$ is

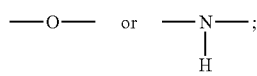

$R_2$ is hydrogen or —$CH_3$, and n is 1 or 2. The hydroxy unsaturated carbonyl may be a compound comprising at least one selected from the group consisting of hydroxyethylacrylate, N-hydroxymethylacrylamide, N-hydroxymethyl methacrylamide, hydroxyethylmethacrylate, hydroxymethylacrylate, hydroxymethylmethacrylate, N-hydroxyethylacrylamide, N-hydroxyethylmethacrylamide, and a combination thereof.

Examples of suitable initiators are azo compounds generally represented by the formula:

Z—N=N—B where Z is

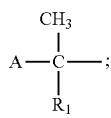

B is Z or $R_2$;
$R_1$ is —$CH_3$ or —C≡N;
A is

—$(CH_2)_2COOH$, or —$CH_3$;
$R_2$ is

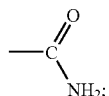

$R_3$ is =N—, =NH, or =O; and
$R_4$ is

—$NH(CH_2)_2OH$, —$NHC(CH_2OH)CH_3$, or —$NHC(CH_2OH)_3$,
where $R_4$ is

when $R_3$ is =N—, and
where $R_1$ is —C≡N and A is —$CH_3$ when B is $R_9$.

In some embodiments, suitable examples of an azo compound may include 2,2'-Azobis(N,N'-dimethylene isobutyramidine)dihydrochloride, 2,2'-Azobis(2-amidinopropane)dihydrochloride, and 2,2'-Azobis[2-methyl-N-(2-hydroxethyl) propionamide].

Further description of crosslinkable materials and initiators can be found in U.S. Pat. Nos. 5,358,051 and 5,335,726, each of which is incorporated by reference herein in its entirety. In an embodiment, the crosslinkable material is 2-hydroxy ethyl acrylate monomer, and the initiators used therewith are different azo-compounds. These particular types of crosslinkable materials are commercially available in a single PERMSEAL system available from Halliburton Energy Services. Additional disclosure regarding gel systems comprising one or more crosslinkable materials may be found in U.S. Pat. No. 6,936,574, which is incorporated by reference herein in its entirety.

2. High Density Aqueous Salt Solutions, Water Soluble Polymerizable Monomers, and Polymerization Initiators In an embodiment, a sealant composition may include a gel system comprising a high density aqueous salt solution, a water soluble polymerizable monomer, and a polymerization initiator. The high density aqueous salt solution utilized can contain various salts. Such salts may include zinc bromide, calcium chloride, sodium chloride, potassium chloride and mixtures of such salts, with zinc bromide being a desirable selection. In some embodiments, the salt solution utilized preferably has a density in the range of from about 9 to about 18 pounds per gallon.

A variety of water soluble polymerizable monomers can be utilized in the polymeric high density aqueous salt gel systems. Examples of such monomers include, but are not limited to, acrylic acid, methacrylic acid, acrylamide, methacrylamide, 2-methacrylamide-2-methyl propane sulfonic acid, 2-acrylamido-2-methyl propane sulfonic acid, N,N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamidopropyl trimethylammonium chloride, N-vinyl pyrrolidone, vinyl phosphonic acid and methacryloyloxyethyl trimethylammonium sulfate and mixtures thereof. Additional more preferred monomers include hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate, and mixtures thereof. Of these, hydroxyethylacrylate is most preferred.

Such water soluble polymerizable monomers may be used in combination with cross-linking multi-functional vinyl monomers such as glycerol dimethacrylate and diacrylate, ethoxylated and propoxylated glycerol dim ethacrylate and diacrylate, ethoxylated and propoxylated glycerol trimethacrylate and triacrylate, ethoxylated and propoxylated trimethylolpropane trimethacrylate and triacrylate, ethoxylated and propoxylated pentaerythritol di, tri and tetra methacrylate and acrylate, methylene-bis-acrylamide and methacrylamide, polyethylene and polypropylene glycol dimethacrylate and diacrylate, allylmethacrylate and acrylate, and mixtures thereof.

Suitable polymerization initiators can be alkali metal persulfates, such as sodium persulfate, potassium persulfate and ammonium persulfate, peroxides such as hydrogen peroxide and tertiary-butyl hydro peroxide, oxidation-reduction systems employing oxidizers such as copper (I) and reducing agents such as bisulfate, and azo polymerization initiators. Examples of suitable azo polymerization initiators may include: 2,2'-azobis (N,N'-dimethylene isobutyramidine)dihydrochloride, which has an activation temperature of approximately 111° F.; 2,2'-azobis(2-amidinopropane)dihydrochloride, which has an activation temperature of approximately 133° F.; and 2,2'-azobis[2-methyl-N-(2-hydroxyethyl)propionamide, which has an activation temperature of approximately 187° F. These and other azo compounds may be utilized to initiate polymerization at temperatures in the range of from about 70° F. to about 190° F. without the use of an oxygen scavenger.

Additional disclosure on gel systems comprising a high density aqueous salt solution, a water soluble polymerizable monomer, and a polymerization initiator may be found in U.S. Pat. No. 6,187,839, which is incorporated herein by reference in its entirety.

3. Cross-Linking Agents and Selected Water Soluble Polymers

In an embodiment, the sealant compositions may include a gel system comprising water, a cross-linking agent, and a selected water soluble polymer or mixture of polymers. The water in such systems can be fresh water, unsaturated salt water or saturated salt water. The type of water utilized may change the pumping time of the sealing composition before gelation occurs. Generally, the pumping time increases with increasing salt concentration in the water. The water can contain one or more salts such as potassium chloride, ammonium chloride and sodium chloride, or it can be brine or seawater.

A variety of water-soluble polymers can be utilized in gel systems comprising water, a cross-linking agent, and a selected water-soluble polymer or mixture of polymers. The polymer or polymers can be selected from homopolymers, copolymers, terpolymers and mixtures thereof. Examples of such suitable polymers include, but are not limited to, polyacrylamide, sulfonated styrene/maleic anhydride copolymers, vinylpyrrolidone/AMPS/acrylamide terpolymers, AMPS/N—N-dimethylacrylamide/acrylamide terpolymers, polyketones and oxidized polyvinyl alcohol. The water soluble polymers can be biodegradable and/or non-toxic. Examples of such polymers include alginic acid derivatives, oxidized polyvinyl alcohol, and low molecular weight acrylic polymers. Generally, by increasing the fraction of bulky or less reactive monomers in the polymer, the temperature at which gelation occurs can be increased, the pumping time at a given temperature can be increased and/or the stability of the gel formed can be increased or decreased.

While various cross-linking agents can be utilized in accordance with the gel systems comprising water, a cross-linking agent, and a selected water soluble polymer or mixture of polymers, non-toxic organic cross-linking agents which are free from metal ions and the like are desirable. Examples of such organic cross-linking agents are polyalkyleneimines, polyalkylenepolyamines, and mixtures thereof. In addition, water-soluble polyfunctional aliphatic amines, arylalkylamines, and heteroarylalkylamines can be utilized. Of these, polyalkyleneimines, and in particular polyethyleneimine, are desirable cross-linking agents for use in accordance with this gel system. Another desirable, organic cross-linking agent is chitosan, which is biodegradable and non-toxic. Chitosan is a polymeric glucosamine derivative of chitin, which is a naturally occurring glucosamine polysaccharide structurally similar to cellulose. When chitosan is utilized as the cross-linking agent, the water can include an organic or inorganic acid to facilitate the dissolution of the chitosan.

A gelation accelerating agent can be utilized to reduce pumping time before gelation at a given temperature. Such a gelation accelerating agent can be a pH control compound such as an alkali metal carbonate, bicarbonate or hydroxide, a mineral acid such as hydrochloric acid, an organic acid such as acetic acid, a Lewis acid such as boric acid, or other compounds such as ammonium chloride, urea and lactose.

Additional disclosure on gel systems comprising water, a cross-linking agent, and a selected water soluble polymer or mixture of polymers may be found in U.S. Pat. Nos. 6,176,315; 6,607,035; and 6,843,841, which are incorporated herein by reference in their entirety.

4. Oxidized Chitosan-Based Compounds and Water-Soluble Compounds Having Carbonyl Groups In an embodiment, the sealant compositions may include a gel system comprising water, an oxidized chitosan-based compound, and a water-soluble compound having carbonyl groups. The water can be from any convenient source, including fresh water, seawater, natural brine, formulated brine, 2% KCl solution, and any mixtures in any proportion thereof.

The present disclosure advantageously provides an oxidized chitosan-based compound, a material derived from natural sources, to crosslink with a variety of polymers over a broad temperature range and produce gels for conformance applications. Chitosan-based compounds suitable for oxidation can be comprised of chitosan and chitosan salts of mineral or organic acids. Some commercial examples of chitosan include CHITOSAN LACTATE, which is available from Vanson HaloSource, and HYDAGEN HCMF, which is available from Cognis.

The oxidized chitosan-based compound can be crosslinked with a variety of polymers that include, but are not limited to, a water-soluble compound having carbonyl groups, namely polyacrylamide, or alkyl acrylate polymers. Gels ranging from stiff and ringing type to "lipping" gels are obtained. In an embodiment, the water-soluble compound having carbonyl groups comprises an acrylamide-based polymer. Suitable acrylamide-based polymers may include saturated or unsaturated acrylamide-based polymers. In certain embodiments, an acrylamide-based polymer includes partially hydrolyzed polyacrylamide (PHPA), a copolymer of acrylamide and t-butyl acrylate (PA-t-BA), acrylic acid/amps copolymer (AMPS/AA), and mixtures thereof. However, other acrylamide-based polymers that have the ability to crosslink with the oxidized chitosan-based compound can also be used.

In other embodiments of a gel system comprising water, an oxidized chitosan-based compound, and a water-soluble compound having carbonyl groups, the water-soluble compound having carbonyl groups includes oxidized starch. Starch suitable for oxidation may include a number of starch-based compounds. Examples of suitable starch-based compounds include corn starch, potato starch, waxy maize, dextrinized starch, and any mixtures in any proportion thereof.

A wide variety of oxidizers can be used to oxidize starch. Examples of appropriate oxidizers include, but are not limited to, sodium hypochlorite, sodium periodate, hydrogen peroxide, peracetic acid, and any mixture in any proportion thereof. It is understood by those skilled in the art that related polysaccharides, other than oxidized starch, can be used to crosslink with the oxidized chitosan-based compound, including oxidized cellulose, oxidized agarose, oxidized partially-acetylated cellulose, oxidized gums, and combinations thereof. Other compounds that can be used include dialdehyde starch (DAS), dialdehyde cellulose, and combinations thereof.

Additional disclosure on gel systems comprising water, an oxidized chitosan-based compound, and a water-soluble compound having carbonyl groups may be found in U.S. Pat. No. 6,764,981, which is incorporated herein by reference in its entirety.

5. Amine-Based Polymers, Polysaccharide-Based Polymers, and Oxidizing Agents

In an embodiment, the sealant compositions may include a gel system comprising water, an amine-based polymer, a polysaccharide-based polymer, and an oxidizing agent that is capable of at least partially oxidizing at least the polysaccharide-based polymer. The water for suitable for use in the sealant composition may be from any source, including fresh water, seawater, natural brine, formulated brine, 2% KCl solution, and any combination in any proportion thereof. Representative soluble salts are the chloride, bromide, acetate and formate salts of potassium, sodium, calcium, magnesium and zinc.

Amine-based polymers suitable for use in the present invention may comprise at least one member selected from the group of chitosan, chitosan salts, oxidized chitosan, poly (vinyl alcohol-vinyl amine), polylysine, polyethyleneimine, and any combination in any proportion thereof. In one embodiment, the amine-based polymer comprises a chitosan-based polymer. The chitosan-based polymer may comprise chitosan, chitosan salts, oxidized chitosan, and any combination in any proportion thereof. In some embodiments, the chitosan-based polymers may have pendant amino groups on the polymer which can react with the carbonyl group of the oxidized polysaccharides. The pendant amino group may be a primary or secondary amine. Occasionally, a pendant amine may be a part of a branched structure of a polymer. Examples of such polymers which may be useful in the present invention include polyethyleneimine. Poly(vinyl alcohol vinyl amine) polymers, also referred to as vinylalcohol/vinylamine copolymers are available, for example, from ERKOL Corp. of Tarragona Spain.

In one embodiment, an oxidized chitosan-based polymer is employed to overcome the relative poor solubility of chitosan. The oxidized chitosan-based polymer can be prepared by oxidizing the chitosan-based polymer selected from the group consisting of chitosan, chitosan salts, and any combination in any proportion thereof. The oxidized chitosan-based polymer can serve both as a crosslinker and base polymer to the oxidized polysaccharide-based polymer. Some examples of chitosan-based polymers suitable for oxidation in the present invention include chitosan, chitosan salts with mineral and organic acids, and any combination in any proportion thereof. Some commercial examples of chitosan have been introduced above, and may include CHITOSAN LACTATE available from Vanson HaloSource and HYDAGEN HCMF available from Cognis.

To oxidize the chitosan-based polymer, a wide variety of oxidizers can be used. Examples of suitable oxidizers may include sodium hypochlorite, sodium periodate, hydrogen peroxide, peracetic acid, and any mixtures in any proportion thereof. Other oxidizers include alkali, alkaline earth and transition metal salts of periodate, hypochlorite, perbromate, chlorite, chlorate, hydrogen peroxide, soluble peroxide salts, persulfate salts, percarboxylic acids, oxyhalo acids, and any combination in any proportion thereof. The selection of the oxidizer and the concentration of oxidizer should be sufficient to oxidize or degrade the chitosan-based polymer to a desired solubility. Oxidizing the chitosan-based polymer may increase its solubility. By increasing solubility of the chitosan-based polymer, it can be used in higher concentration in fluids, thereby utilizing it as the base polymer in the fluids, rather than merely as a crosslinker.

It should be understood by those skilled in the art that the oxidizing agent is also capable of oxidizing the chitosan-based polymer to at least partially self-crosslink in water. Further, the oxidizing agent is capable of oxidizing the polysaccharide-based polymer to at least partially self-crosslink in water. Still further, the oxidizing agent is also capable of oxidizing the polysaccharide-based polymer to form an oxidized polysaccharide-based polymer and crosslink with the chitosan-based polymer in water. The oxidizing agent is also capable of oxidizing the chitosan-based polymer to form an oxidized chitosan-based polymer and is capable of oxidizing the polysaccharide-based polymer to form an oxidized polysaccharide-based polymer, such that the oxidized chitosan-based polymer crosslinks with the oxidized polysaccharide-based polymer in water. Gels ranging from stiff and ringing type to "lipping" gels can be obtained.

Examples of polysaccharide-based polymers for use in the well treatment fluid of the present invention may include starch, cellulose, agarose, partially-acetylated cellulose, hydroxyl ethyl cellulose, gum, and any combination in any proportion thereof. The gum may be selected from the group consisting of guar, locust bean gum, gum arabic, tragacanth, gutta percha, xanthan salts, alginate salts, carrageenan, scleroglucan, and any combination in any proportion thereof.

In some embodiments, a starch suitable for use may comprise at least one starch selected from the group consisting of corn starch, potato starch, waxy maize, dextrinized starch and any mixtures in any proportion thereof. Additionally, the starches may be modified chemically prior to oxidation. Examples of such starches include cationic starches, hydroxyethylated starches, hydroxypropylated starches, carboxylated starches and the like.

A variety of oxidizers can be used to oxidize the starch, including oxidizers selected from the group consisting of alkali, alkaline earth and transition metal salts of, for example, periodate, hypochlorite, perbromate, chlorite, chlorate, hydrogen peroxide, peracetic acid, soluble peroxide salts, persulfate salts, percarboxylic acids, oxyhalo acids, and combination in any proportion thereof.

Additional disclosure on gel systems comprising water, an amine-based polymer, a polysaccharide-based polymer, and an oxidizing agent that is capable of at least partially oxidizing at least the polysaccharide-based polymer may be found in U.S. Pat. No. 7,007,752, which is incorporated herein by reference in its entirety.

6. Chitosan, Polymers Capable of Reacting with Chitosans, and a Gelation Retarding Additive In an embodiment, the sealant compositions may include a gel system comprising an aqueous fluid, chitosan, a polymer capable of reacting with chitosan, and a gelation retarding additive wherein the gelation retarding additive comprises a carboxylic acid anhydride.

The aqueous fluid used for the sealant compositions of the present invention may include, but is not limited to, freshwater, seawater, saltwater, or brines (e.g., natural brines, formulated brines, etc.), or a mixture thereof. The aqueous fluid may be from any source, provided that it does not adversely affect the sealant compositions of the present invention. Formulated brines may be produced by dissolving one or more soluble salts in water, a natural brine, or seawater. Representative soluble salts may include the chloride, bromide, acetate, and formate salts of potassium, sodium, calcium, magnesium, and zinc. To facilitate the dissolution of the chitosan, the aqueous fluid may further contain an organic or inorganic acid.

The gel system may further comprise chitosan, including chitosan, chitosan salts of mineral or organic acids, unoxidized chitosan, oxidized chitosan, or modified chitosan, or mixtures thereof. Suitable details on chitosan, oxidized chitosan, oxidation of chitosan, chitosan oxidizers, and employment of chitosan in gel systems are described above.

Any suitable polymers that are capable of reacting with chitosan may be used in the gel systems. Generally, suitable polymers include, among others, those polymers comprising a carbonyl group, such as, for example, saturated or unsaturated acrylamide-based polymers. Other examples include, but are not limited to, polyacrylamide, acrylamide copolymers, polyvinyl pyrrolidone, 2-acrylamido-2-methylpropane sulfonic acid/acrylamide copolymers, sulfonated styrene/maleic anhydride copolymers, vinylpyrrolidone/2-acrylamido-2-methylpropane sulfonic acid/acrylamide terpolymers, 2-acrylamido-2-methylpropane sulfonic acid/N—N-dimethylacrylamide/acrylamide terpolymers, polyketones, acrylamide/t-butyl acrylate copolymers, oxidized polyvinyl alcohol, and water-soluble or water-dispersible polyesters (such as poly(lactic acid)), and mixtures and derivatives thereof. Those of ordinary skill in the art with the benefit of this disclose will recognize that other polymers that react with chitosan may also be used in the present invention.

In some embodiments, the polymer comprising a carbonyl group includes oxidized starch. Examples of suitable starches include, but are not limited to, corn starch, potato starch, waxy maize, dextrinized starch, and mixtures thereof. A wide variety of oxidizers can be used to oxidize starch. Examples of suitable oxidizers include, but are not limited to, sodium hypochlorite, sodium periodate, hydrogen peroxide, peracetic acid, and mixtures thereof. Those skilled in the art with the benefit of this disclosure will appreciate that related oxidized polysaccharides, other than oxidized starch, can be used to crosslink with chitosan, including oxidized cellulose, oxidized agarose, oxidized partially-acetylated cellulose, oxidized gums, and mixtures thereof. Other compounds that may be used include dialdehyde starch (DAS), dialdehyde cellulose, and mixtures thereof. In certain embodiments, the oxidized polysaccharides contain at least some ketone, aldehyde, or anhyride functional groups upon oxidation.

The gel systems may further comprise a gelation retarding additive. Among other things, the gelation retardation additive may act to retard the reaction between the chitosan and the polymer, e.g., the gelation of the sealant compositions. Delaying the gelation of the sealant compositions may be desirable to increase the pumping time before gelation at a given temperature. In addition, the carboxylic acid anhydrides of the present invention may have some water solubility or some water dispersibility. Suitable gelation retarding additives may include carboxylic acid anhydrides. Examples of suitable carboxylic acid anhydrides include, but are not limited to, acetic anhydride, propionic anhydride, succinic anhydride, maleic anhydride, and mixtures and derivatives thereof.

Additional disclosure on gel systems comprising an aqueous fluid, chitosan, a polymer capable of reacting with chitosan, and a gelation retarding additive may be found in U.S. Pat. No. 7,322,414 and U.S. Patent Publication No. 2006/0293446A1, each of which is incorporated herein by reference in its entirety.

7. Water-soluble Polymers Having Acylated Amine Units

In an embodiment, the sealant compositions may include a gel system comprising a water-soluble polymer having acylated amine units that acts as a cross-linker. This gel system further comprises a crosslinkable water-soluble polymer that comprises a functional group selected from the group consisting of carboxylic acid and carboxylic acid derivative.

The water for use in the gel system can be from any source, including fresh water, seawater, natural brine, formulated brine, 2% KCl solution, and any mixture of any of the foregoing in any proportion thereof. Formulated brine may be manufactured by dissolving one or more soluble salts in water, natural brine, or seawater. Representative soluble salts are the chloride, bromide, acetate and formate salts of potassium, sodium, calcium, magnesium and zinc.

The gel system includes a crosslinkable, water-soluble polymer comprising at least one acylated amine unit. The amine is acylated preferably prior to injection into the subterranean formation. In this way, the composition of the invention advantageously has a low tendency to crosslink and gel in the wellbore (i.e. reduced gel build-up) and has rapid crosslinking at the high temperatures of the formation. Preferred acylated amine groups include acetyl and formyl amine groups. One way that the acylated amine is formed is by reacting a polyamine with a carboxylic acid anhydride or ester. Preferred carboxylic anhydrides for acylation are acetic anhydride and formic anhydride. Preferred carboxylic esters for acylation include alkyl acetate, for example ethyl acetate, butyl acetate, ethyl formate, and butyl formate. The acylated amine can also be formed by acylating poly(vinyl amine/vinyl alcohol). Alternately, the acylated amine can be formed by acylating polyalkylene polyamine, for example, polyethyleneimine (PEI). Also, the acylated amine can be formed by polymerizing a monomer containing acylated amine, for example vinylformamide to form a water-soluble polymer polyvinylformamide. The vinylformamide can be copolymerized with other monomers, for example 2-acrylamido-2- methylpropanesulfonic acid (AMPS), and/or N,N-dimethylacrylamide (NNDMA). Polyvinylformamide for use in the invention provides a more environmentally acceptable crosslinker as compared to the conventionally-used crosslinker, PEI. As those skilled in the art understand, other acylated amines that are not mentioned herein are also useful for the invention.

Preferably, the degree of acylation of the amine groups in the water-soluble polymer can range from 5% to 100% of the amine groups. In the case of acylating polyamine, the degree of acylation can be varied by controlling the amount of acylating compound, for example carboxylic anhydride in relation to the molar amounts of the amines present in the polymer. Alternately, the degree of acylation in an acylated polymer can be varied by controlled hydrolysis of the acyl groups in the presence of an acid or a base.

The concentration of the acylated amine in the sealant composition is selected to give a desired gel time. For example, the concentration can be in the range of 0.2% to 10% by weight of the sealant composition. The ratio of the acylated amine to the crosslinkable water-soluble polymer comprising a functional group consisting of carboxylic acid and carboxylic acid derivative is from about 1:0.5 to about 1:20, preferably in the ratio of 1:3 to 1:10.

The gel system may also comprise a crosslinkable water-soluble polymer comprising a functional group selected from the group consisting of carboxylic acid and carboxylic acid derivative. The carboxylic acid derivative, for example, can consist of an ester, an amide, an anhydride, an imide, and a nitrile group. Such polymers can be homopolymers, copolymers, and/or terpolymers made from a variety of monomers. Examples of suitable polymers may include the polymerization reaction product of acrylamide and t-butyl acrylate, a terpolymer of 2-acrylamido-2-methylpropanesulfonic acid copolymer (AMPS), acrylamide (AA), and N,N-dimethylacrylamide (NNDMA). Such polymers can be obtained by processes described in U.S. Pat. Nos. 6,192,986; 5,836,392; and 6,176,315, all assigned to the assignee of the present invention, and all herein incorporated by reference in their entirety. Examples of such polymers may include polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N—N-dimethylacrylamide/acrylamide terpolymers; sulfonated styrene/maleic anhydride copolymer; a vinyl pyrrolidone/2-acrylamido-2-methylpropane sulfonic acid/acrylamide terpolymer; an 2-acrylamido-2-methylpropane sulfonic acid/N—N-dimethylacrylamide/acrylamide terpolymer; and any mixture of any of the foregoing in any proportion thereof. Other compounds that can be used to crosslink with the water-soluble polymer comprising acylated amine units are disclosed in U.S. Pat. No. 6,176,315, which is incorporated by reference in its entirety. Another example of an acrylamide based copolymer is described in U.S. Pat. No. 5,836,392, which is also incorporated by reference in its entirety.

Additional disclosure on gel systems comprising a water-soluble polymer comprising acylated amine units that acts as a cross-linker may be found in U.S. Pat. No. 7,331,390, which is incorporated herein by reference in its entirety.

8. Water-Soluble Polymers Comprising Polymerized Vinyl Amine Units and Organic Compounds In an embodiment, the sealant compositions may include a gel system comprising water, a water-soluble polymer comprising polymerized vinyl amine units, and an organic compound capable of crosslinking with the vinyl amine units of the water-soluble polymer. As described above, the water used for the sealant composition can be from any source.

The water-soluble polymer of the gel systems comprises polymerized vinyl amine units, for example vinyl amine units or a copolymer of vinyl amine units and vinyl alcohol units, also known as polyvinyl amine/vinyl alcohol. Such copolymer can be in the form of a salt.

In some embodiments, the gel systems may also comprise an organic compound capable of crosslinking with the vinyl amine units of the water-soluble polymer. The organic compound may be selected from the group consisting of polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N—N-dimethylacrylamide/acrylamide terpolymers; sulfonated styrene/maleic anhydride copolymer; a vinyl pyrrolidone/2-acrylamido-2-methylpropane sulfonic acid/acrylamide terpolymer; a 2-acrylamido-2-methylpropane sulfonic acid/N—N-dimethylacrylamide/acrylamide terpolymer; and any combination in any proportion of the foregoing. The organic compound may also comprise an acrylamide-based polymer.

Additional disclosure on gel systems comprising water; a water-soluble polymer comprising polymerized vinyl amine units; and an organic compound capable of crosslinking with the vinyl amine units of the water-soluble polymer may be found in U.S. Pat. No. 7,128,148, which is incorporated herein by reference in its entirety.

9. Water-Soluble Salts and Activators

In an embodiment, the sealant compositions may include a gel system comprising a water-soluble salt and an activator. Examples of suitable water-soluble salts include without limitation an alkali metal metasilicate compound, an alkali metal silicate compound, an alkali metal aluminate, or combinations thereof. In an embodiment, the water-soluble salt may comprise sodium silicate, potassium silicate, sodium aluminate, or combinations thereof, preferably sodium silicate. Examples of activators include, ethyl acetate, urea, sugar, sodium acid pyrophosphate, chloride, acetate and nitrate salts of alkali and alkaline earth metals, or combinations thereof.

Reaction of the activator and the water-soluble salt, for example sodium silicate, forms an insoluble silica gel or metal silicate matrix. Additional disclosure on gel systems comprising a water-soluble salt and an activator may be found in U.S. Patent Publication No. 2006/0086501, which is incorporated herein by reference in its entirety.

10. Synthetic Hectorite Clay Gelling and Thixotropy-Imparting Agents

In an embodiment, the sealant compositions may include a gel system comprising a synthetic hectorite clay gelling and thixotropy-imparting agents. In some embodiments, the gelling and thixotropy-imparting agents may provide stable viscosity to a sealant composition when at rest as well as thixotropic properties whereby the viscosity of the sealant composition is reduced during pumping but returns when the sealant composition is static. The gelling and thixotropy-imparting agents are in the form of free-flowing powders, which are easily dispersed in water. Also, the agents are fine grained with an average particle size of less than one micron.

The synthetic hectorite clay gelling and thixotropy-imparting agents may be selected from the group comprising a synthetic hectorite clay having the composition by weight on a dry basis of approximately 59.5% $SiO_2$, 27.5% MgO, 0.8%

Li$_2$O and 2.8% Na$_2$O, a synthetic hectorite clay having the composition by weight on a dry basis of approximately 54.5% SiO$_2$, 26.0% MgO, 0.8% Li$_2$O, 5.6% Na$_2$O and 4.1% P$_2$O$_5$ and a synthetic hectorite clay having the composition by weight on a dry basis of approximately 54.5% SiO$_2$, 26.0% MgO, 0.8% Li$_2$O, 5.6% Na$_2$O, 4.1% P$_2$O$_5$ and also containing inorganic polyphosphate peptizers. The hectorite clay gelling and thixotropy-imparting agent may be present in the sealant composition in an amount in the range of from about 0.5% to about 5% by weight thereof.

The sealant composition employed in the practice of this invention may comprise substantially any aqueous fluid including fresh water that contains a relatively small amount of inorganic monovalent salts, multivalent salts or both. That is, the water should contain at least a small amount of one or more salts, but not more than an amount of about 5% by weight of the aqueous liquid. The presence of the small amount of salt or salts in the water enables the synthetic hectorite clay gelling and thixotropy-imparting agent to form a gel in the aqueous liquid and impart thixotropic properties thereto.

In order to stabilize the viscosity during pumping a separate viscosity stabilizing gelling agent can be included in the sealant composition. Examples of commonly used gelling agents include galactomannans, modified or derivatized galactomannans and cellulose derivatives. Cross-linking agents, breakers and other additives can also be included in the sealant compositions useful in accordance with this invention.

Additional disclosure on gel systems comprising a hectorite clay gelling and thixotropy-imparting agent may be found in U.S. Patent Publication No. 2003/0213593A1, which is incorporated herein by reference in its entirety.

11. Acrylamide Polymers and Crosslinking Agents

In an embodiment, the sealant compositions may include a gel system comprising an acrylamide polymer and a crosslinking agent. The acrylamide polymer may be either polyacrylamide or partially hydrolyzed polyacrylamide, depending on the number of carboxylate groups it has. An acrylamide polymer having substantially less than 1% of the acrylamide groups in the form of carboxylate groups is termed polyacrylamide (PA); an acrylamide polymer having at least 1% but not 100% of the acrylamide groups in the form of carboxylate groups is termed partially hydrolyzed polyacrylamide (PHPA). The average molecular weight of the acrylamide polymer may be in the range of about 10,000 to about 50,000,000 and preferably about 100,000 to about 20,000,000, and most preferably about 200,000 to about 12,000,000.

The crosslinking agent may be a complex or mixture of complexes. The term "complex" is defined herein as an ion or molecule containing two or more interassociated ionic, radical or molecular species. A complex ion as a whole has a distinct electrical charge while a complex molecule is electrically neutral.

The complex may include at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

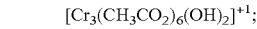

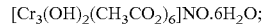

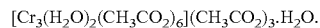

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species may include the following water-soluble species: formate, acetate, propionate, lactate, lower substituted derivatives thereof, and mixtures thereof. The optional inorganic ions may include sodium, sulfate, nitrate and chloride ions.

Additional disclosure on gel systems comprising an acrylamide polymer and a crosslinking agent may be found in U.S. Pat. Nos. 4,629,747 and 4,683,949, each of which is incorporated herein by reference in its entirety.

12. Colloidal Silica

In an embodiment, the sealant compositions may include a gel system comprising colloidal silica. Such sealant compositions may also comprise an activator. As used herein, the term "colloidal silica particles" generally refers to amorphous particles that are described by the chemical formula SiO$_2$ and have an average diameter of about 150 nm or smaller.

The colloidal silica particles suitable for use in the sealant compositions of the present invention may be colloidal silica particles of any grade, particle size, or surface area, and the particles may have any particle size distribution. In some embodiments, the average particle size of the colloidal silica particles is about 40 nm or less. In some embodiments, the colloidal silica particles used in the present invention may have a particle size of about 15 nm or less, or more preferably, of about 10 nm or less. In one embodiment, the colloidal silica has a particle size in the range of about 2 nm to about 10 nm. In some embodiments, colloidal silica particles are present in the sealant compositions in an amount in the range of from about 0% to about 60% by weight of the sealant composition.

As mentioned above, the colloidal silica gel systems may also comprise an activator. Activators suitable for use in the sealant compositions of the present invention may comprise any substance that is capable of reacting with a colloidal silica component to increase the viscosity. In some embodiments, the activator may comprise an organic or inorganic salt, nitrate, sulphate, sulphide, hydroxide, or acid. In some embodiments, a suitable activator may comprise salts such as sodium chloride, potassium chloride, sodium nitrate, potassium nitrate, and the like, and combinations thereof. In some embodiments the activator may be provided as a powdered material, while in other embodiments, the activator may be provided as a liquid material, e.g., as a solution or a suspension of a powdered material in liquid. In some embodiments, the type and amount of activator used may depend on several factors including the colloidal silica-component used, the temperature of the subterranean formation, the desired time in which the viscosity of the treatment fluid should begin to increase and/or reach its final viscosity, etc.

In some embodiments, the activator may be present in the treatment fluid in an amount in the range of about 0.001% m/v to about 10% i/v of the colloidal silica component. As used herein, a treatment fluid comprising, for example 2% m/v activator, comprises about 2 grams of activator per approximately 100 mL of colloidal silica component in the treatment fluid. In some embodiments, the activator may be present in an amount in the range of about 0.01% in/v to about 5% in/v. In some embodiments, the activator may be present in an amount in the range of about 0.05% m/v to about 2% m/v of the colloidal silica component.

C. Leak Off Prevention Material

As previously mentioned, in addition to a diutan composition and one or more gel systems, the sealant compositions of the present invention further comprise a leak off prevention material (LPM). The LPM may function to control leak off of the polymer gel into the formation. The LPM may be a particulate material (e.g., cement, silica flour), a water-soluble material (e.g. starch, hydrophobically modified polymers) or combinations thereof. In various embodiments, the LPM may comprise cement alone or in combination with other particulate material. In an embodiment, the LPM comprises a reduced amount of cement relative to an otherwise similar conventional cement composition, for example a cement composition disclosed in U.S. Pat. No. 6,875,729, incorporated by reference herein in its entirety. In an embodiment, the LPM does not comprise cement, and thus cementless sealant compositions are contemplated wherein LPM other than cement is used to control the leak off of polymer gel into the formation.

The sealant compositions comprise an effective amount of LPM to prevent leak off of the polymer gel into the formation beyond a desired depth, for example beyond the effective perforation depth. Furthermore, the amount of crosslinker or activator in a gel system may be adjusted to lengthen the gel time of the sealant compositions to greater than or equal to about 4 hours when the composition is exposed to ambient temperatures in the wellbore. In an embodiment, the gel time is in a range of from about 4 hours to about 12 hours, alternatively, from about 4 to about 8 hours, alternatively, from about 4 to about 6 hours. In particular, the amount of cement when present in the sealant compositions may be in a range of from about 0% to about 50% by weight of the sealant composition. As used herein, gel time is defined as the period of time from initial mixing of the components in the sealant composition to the point when a gel is formed. Further, as used herein, a gel is defined as a crosslinked polymer network in a liquid medium. A gel system, as the term is used herein, generally includes gelling components of a sealant composition other than the LPM. In embodiments, the various gel systems described herein may be used alone or in combination with one another in the sealant compositions.

In some embodiments, the LPM is a particulate material such as cement. In embodiments where the LPM comprises a cement, any suitable cement known in the art may be used in the sealant compositions. An example of a suitable cement includes hydraulic cement, which comprises calcium, aluminum, silicon, oxygen, and/or sulfur and which sets and hardens by reaction with water. Examples of hydraulic cements include, but are not limited to a Portland cement, a pozzolan cement, a gypsum cement, a high alumina content cement, a silica cement, a high alkalinity cement, or combinations thereof. Preferred hydraulic cements are Portland cements of the type described in American Petroleum Institute (API) Specification 10, $5^{th}$ Edition, Jul. 1, 1990, which is incorporated by reference herein in its entirety. The cement may be, for example, a class A, B, C, G, or H Portland cement. Another example of a suitable cement is microfine cement, for example, MICRODUR RU microfine cement available from Dyckerhoff GmBH of Lengerich, Germany.

Other particulate material may be used in the sealant composition alone or in combination with cement. The particulate material may be an inert material, and may be sized (e.g., a suitable particle size distribution) based upon the characteristics of the void space to be sealed. Examples of suitable particulate material include, but are not limited to, cement, sand, silica flour, gilsonite, graphite; fibrous materials such as cedar bark, shredded cane stalks and mineral fiber; flaky materials such as mica flakes and pieces of plastic or cellophane sheeting, ground battery casings, ground rubber tires; and granular materials such as ground and sized limestone or marble, wood, nut hulls, formica, corncobs, gravel, ground battery casings, ground rubber tires and cotton hulls.

In an embodiment, the LPM is a water-soluble material. Examples of water-soluble materials suitable for use as an LPM include without limitation starches, hydrophobically modified polymers, or combinations thereof. In an embodiment, the LPM is a granular starch or mixture of starches. Accordingly, as used hereinafter, the term "starch" is understood to include one or more natural starches, one or more chemically modified starches, and mixtures of one or more natural and/or chemically modified starches. Suitable natural starches include, but are not limited to, those of potato, wheat, tapioca, rice, and corn. Alternatively, the LPM is a pre-gelatinized starch. Pre-gelatinized starches may be obtained commercially or they may be prepared by pre-gelatinization treatment. For pre-gelatinization, the chosen starch granules are heated in water to a point where the starch granules swell irreversibly. Upon cooling, this swollen structure is retained. The use of pre-gelatinized starches may be advantageous, since these materials are stable at higher temperatures in the formation, e.g., up to 300° F. Chemically modified starches are those derived from natural starches by chemical reaction of a natural starch with a suitable organic reactant. Examples of suitable chemically modified starches include, but are not limited to, carboxymethyl starch, hydroxyethyl starch, hydroxypropyl starch, acetate starch, sulfamate starch, phosphate starch, nitrogen modified starch, starch crosslinked with aldehydes, epichlorohydrin, borates, and phosphates, and starches grafted with acrylonitrile, acrylamide, acrylic acid, methacrylic acid, maleic anhydride, or styrene. In an embodiment, the starch is present in the composition in an amount effective to prevent leak-off of the polymer gel. Effective amounts may be determined by one of ordinary skill in the art.

In an embodiment, the LPM comprises a water-soluble polymer with hydrophobic modification, referred to herein as a hydrophobically modified polymer. Hydrophobically modified polymers useful for the present disclosure may have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized utilizing any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

D. Suitable Aqueous Fluids

Suitable aqueous base fluids that may be used in the sealant compositions of the present invention may include fresh water, salt water, brine, seawater, or any other aqueous fluid that, preferably, does not adversely interact with the other components used in accordance with this invention or with the subterranean formation. The type of water utilized may change the pumping time of the sealing composition before gelation occurs. Generally, the pumping time increases with increasing salt concentration in the water. The water can contain one or more salts such as potassium chloride, ammonium chloride and sodium chloride, or it can be brine or seawater. The amount of water present in the disclosed sealant compositions is sufficient to form a pumpable slurry. In embodiments, the amount of water may be in a range of from about 25% to about 75% by weight of the sealant composition.

E. Optional Additives

1. Fluid Loss Control Additives

When appropriate, any suitable fluid loss control additives known in the art may be used, for example polymer fluid loss control additives, particulate fluid loss control additives, or combinations thereof. The fluid loss control additive may function to control loss of fluid, e.g., water, from the sealant composition. In an embodiment, the fluid loss control additive may comprise one or more starches such as those described herein. Such starches may be the same or different; used as an LPM as a fluid loss additive or both; and may be used alone or in combination with another LPM, fluid loss control additive, or both. Examples of suitable fluid loss control additives are disclosed in U.S. Pat. Nos. 5,340,860, 6,626, 992, 6,182,758, each of which is incorporated by reference herein in its entirety. In an embodiment, and in particular in an embodiment where the sealant composition comprises cement, the fluid loss control additives included in the sealant compositions are a copolymer of acrylamido-2-methylpropanesulfonate and N,N dimethylacrylamide, e.g., HALAD-344 fluid loss control additive also available from Halliburton Energy Services, and a particulate matter such as silica flour, silica fume, sodium silicate, microfine sand, iron oxides, manganese oxides, barite, calcium carbonate, ground nut shells, ground wood, ground corncobs, mica, ceramics, ground tires, ground glass, ground drill cutting, etc., or mixtures of these. In an embodiment, and in particular in an embodiment where the sealant composition does not comprise cement, the fluid loss control additives included in the sealant composition may comprise, for example, natural and/or derivatized polysaccharides like galactomannan gums (guar gum, guar derivatives, etc), biopolymers, modified celluloses or combinations thereof in addition to or in lieu of the fluid loss control additives listed in the preceding sentence. The particulate matter preferably has a particle size between 0.5 and 150 microns. A suitable commercially available particulate matter is SSA-1 silica flour available from Halliburton Energy Services. In embodiments comprising polymer fluid loss additives, particulate fluid loss additives, or combinations thereof, the amount of the particulate fluid loss additive in the sealant composition may be in the range from about 30 to about 70% by weight of the sealant composition and the amount of polymer fluid loss control additive present in the sealant composition may be in a range of from about 0.1% to about 3% by weight of the sealant composition.

Additional suitable fluid loss control additives are known in the art as superabsorbents, which are commonly used in absorbent products such as moisture retaining horticultural products, diapers, training pants, and feminine care products. Superabsorbents are swellable crosslinked polymers that have the ability to absorb and store many times their own weight of aqueous liquids by forming a gel. The superabsorbents retain the liquid that they absorb and typically do not release the liquid, even under pressure. Examples of superabsorbents include sodium acrylate-based polymers having three dimensional, network-like molecular structures. The polymer chains are formed by the reaction/joining of millions of identical units of acrylic acid monomer, which have been substantially neutralized with sodium hydroxide (caustic soda). Crosslinking chemicals tie the chains together to form a three-dimensional network, enabling the superabsorbents to absorb water or water-based solutions into the spaces in the molecular network, and thus forming a gel and locking up the liquid.

Still other examples of suitable fluid loss control additives comprise crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof.

In embodiments, the fluid loss control agent may be a dehydrated, crystalline (i.e., solid) polymer. In a preferred embodiment, the crystalline polymer is a crosslinked polymer. In a more preferred embodiment, the crosslinked polymer is a crosslinked polyacrylamide in the form of a hard crystal. DIAMOND SEAL polymer is a suitable crosslinked polyacrylamide commercially available from Baroid Drilling Fluids, Inc., a Halliburton Company, Houston, Tex. The DIAMOND SEAL polymer is available in grind sizes of 1 mm, 4 mm, and 14 mm. The DIAMOND SEAL polymer possesses certain qualities that make it an exceptional swelling agent. For example, the DIAMOND SEAL polymer is water-insoluble and is resistant to deterioration by carbon dioxide, bacteria, and subterranean minerals. Further, the DIAMOND SEAL polymer can withstand temperatures up to at least 250° F. without experiencing breakdown and thus may be used in the majority of locations where oil reservoirs are found. WATER LOCK is a biodegradable starch backbone grafted with acrylonitrile and acrylate that is commercially available from Grain Processing Corporation of Muscantine, Iowa. Additional disclosure on superabsorbents may be found in U.S. Patent Publication No. 2006/0084580A1, which is incorporated by reference herein in its entirety. Other suitable fluid loss control additives are described in European Patent No. 0566118, which is incorporated by reference herein in its entirety.

2. Gel Retarders

In some embodiments, the sealant compositions may further comprise one or more gel retarders. The amount of gel retarder present in the sealant composition may be in a range of from about 0% to about 5% by weight of the sealant composition. In an embodiment, the gel retarder may be an alkali metal carbonate such as sodium carbonate or a formate compound, e.g., water soluble formate, for contributing to the increase in the gel time of the crosslinkable material as described in U.S. Pat. No. 6,838,417, and incorporated by reference herein in its entirety. The amount of the formate compound present in the sealant composition is in a range of from about 0% to about 5% by weight of the sealant composition. Examples of suitable water-soluble formates include ammonium formate, lithium formate, sodium formate, potassium formate, rubidium formate, cesium formate, francium formate, and combinations thereof.

Moreover, the sealant compositions may include a gel retarder as described in U.S. Pat. No. 7,091,160, incorporated by reference herein in its entirety. In an embodiment, the gel retarder is comprised of a chemical compound that is capable of acetylating an organic amine and/or slowly hydrolyzing or thermolyzing to produce one or more acids in the sealant composition. The compounds retard the cross-linking of the sealant composition at high temperatures, i.e., temperatures above about 200° F., for a period of time sufficient to place the sealant composition in the subterranean formation or zone in which the permeability is to be reduced.

Examples of gel retarder chemical compounds that are capable of acetylating an organic amine and/or slowly hydrolyzing or thermolyzing to produce one or more acids that can be utilized in accordance with the present invention include, but are not limited to, anhydrides such as acetic or propionic anhydride, esters such polylactate, amides such as proteins and polyamides, imides such as polysuccinimide, polyacids such as polyaspartic acid polyglutamic acids, and their salts. Of these, polysuccinimide or polyaspartic acid is preferred. Polysuccinimide hydrolyzes or thermolyzes in water to produce iminodisuccinic acid, polyaspartic acid or aspartic acid.

3. Other Additives

As deemed appropriate by one skilled in the art, additional additives may be added to the sealant compositions for improving or changing the properties thereof. Examples of such additives include but are not limited to set retarding agents, set accelerating agents, dispersing agents, strength retrogression control agents, viscosifying agents, and formation conditioning agents. The sealant compositions may further include a clay stabilizer for inhibiting damage to the subterranean formation during injection. The amount and type of clay stabilizer may be selected as deemed appropriate by one skilled in the art.

F. Examples of Some Suitable Methods of the Present Invention

Methods of using the foregoing sealant compositions first include preparing the compositions. The sealant compositions of the present invention may be made by combining an aqueous fluid, a diutan composition, one or more gel systems and a LPM in any order and thoroughly mixing these components (as well as any other optional components) in a manner known to those skilled in the art. In an embodiment, one or more gel systems, are combined first, followed by the addition of an aqueous fluid, a LPM, optional fluid loss control additives and any other additives. In an embodiment, the sealant compositions are prepared immediately prior to use to ensure that they do not form a gel before reaching permeable zones in the wellbore.

Subsequently, the foregoing sealant compositions may be placed in the permeable zones to improve the zonal isolation of a subterranean formation penetrated by the well bore. As used herein, a permeable zone is defined as an area in the well bore through which a fluid can undesirably flow, wherein the permeable zone may be present in a conduit disposed in the wellbore, a cement column disposed in the annulus of the wellbore between the conduit and the wall of the wellbore, a microannulus interposed between the cement column and the conduit, a microannulus interposed between the cement column and the wall of the wellbore, etc. Examples of such permeable zones include, but are not limited to, perforations such as those formed by a perforation gun, fissures, cracks, fractures, streaks, flow channels, voids, high permeability streaks, annular voids, or combinations thereof.

In an embodiment, a cement squeezing technique is employed to place a sealant composition into at least one permeable zone. As indicated previously, the sealant composition has a gel time greater than or equal to about 4 hours, for example, in a range of from about 4 hours to about 12 hours when it is exposed to ambient temperatures in a well bore. Ambient downhole temperatures typically range from about 50° C. to about 175° C. As such, the composition remains pumpable for a sufficient amount of time to allow it to be squeezed into the permeable zone despite being exposed to relatively high temperatures. After placement in the permeable zone, the sealant composition is allowed to set into a rigid mass, thereby plugging the permeable zone such that fluids, e.g., water, most likely cannot pass through the permeable zone to the subterranean formation or vice-versa. Thus, the sealant composition may seal the subterranean formation from outside contaminants and/or prevent the influx of undesirable components from the formation into the wellbore.

In some embodiments in which a sealant composition is allowed to flow into a permeable zone of a subterranean formation, the sealant composition may penetrate a distance up to about one foot from the well bore. In some embodiments, when the sealant composition is introduced into the subterranean formation, some of the sealant composition may be underdisplaced such that some of the sealant composition remains inside the well bore. Later, the sealant composition that remains in the well bore may be mechanically removed, e.g. by high pressure washing or jetting with a post-flush fluid, or by drilling through the treatment fluid with a drill bit.

To facilitate a better understanding of the present invention, the following examples of certain aspects of some embodiments are given. In no way should the following examples be read to limit, or define, the entire scope of the invention.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

Fluid loss control tests were performed on five sample fluids at 190° F. using a Fann model number 38850 double ended filter cell. The cell was fitted on one end with a 5 micron ceramic disk as the filter medium. The composition of each of the five samples is given below in Table 1.

TABLE 1

| Fluid No. | Fluid Composition |
|---|---|
| 1 | 7% KCl Brine, 350 gal/1000 gal of HZ-10 ™ polymer, 40 gal/1000 gal HZ-20 ™ crosslinker, and 8340 lb Silica Flour |
| 2 | 7% KCl Brine, 350 gal/1000 gal of HZ-10 ™ polymer, 40 gal/1000 gal HZ-20 ™ crosslinker, 333 lbs. starch (N-DRIL ™ HT PLUS) |
| 3 | 7% KCl Brine, 350 gal/1000 gal of HZ-10 ™ polymer, 40 |

TABLE 1-continued

| Fluid No. | Fluid Composition |
|---|---|
|  | gal/1000 gal HZ-20 ™ crosslinker, 25 lbs. diutan composition (FDP-848) |
| 4 | 7% KCl Brine, 350 gal/1000 gal of HZ-10 ™ polymer, 40 gal/1000 gal HZ-20 ™ crosslinker, 25 lbs. diutan composition (FDP-848) (repeat) |
| 5 | 7% KCl Brine, 350 gal/1000 gal of HZ-10 ™ polymer, 40 gal/1000 gal HZ-20 ™ crosslinker, 15 lbs. diutan composition (FDP-848) |

Each of the five samples were individually tested in the following manner: After assembling the cell with the ceramic disk, a sample was added to the cell. The top cap was then put into place and heat was applied to the cell until the temperature reached 190° F. Then, using pressurized nitrogen, 500 psi pressure was applied to the top of the cell. The valve on the bottom of the cell was then opened, allowing filtrate to drain from the cell. Filtrate was collected for approximately ten minutes, or until all of the same had drained out, whichever came first. The results are detailed in FIG. 1.

Example 2

Fluid loss control tests were performed on eight sample fluids at 158° F. using a Fann model number 38850 double ended filter cell. The cell was fitted on one end with a 5 micron ceramic disk as the filter medium. The composition of each of the eight samples is given below in Table 2.

TABLE 2

| Fluid No. | Fluid Composition |
|---|---|
| 1 | 7% KCl Brine, 8340 lbs. Silica Flour, 350 gal/1000 gal of HZ-10 ™ polymer, 60 gal/1000 gal HZ-20 ™ crosslinker |
| 2 | 7% KCl Brine, 333 lbs. starch (N-DRIL ™ HT PLUS), 350 gal/1000 gal of HZ-10 ™ polymer, 60 gal/1000 gal HZ-20 ™ crosslinker |
| 3 | 7% KCl Brine, 200 lbs. starch (N-DRIL ™ HT PLUS), 350 gal/1000 gal of HZ-10 ™ polymer, 60 gal/1000 gal HZ-20 ™ crosslinker |
| 4 | 7% KCl Brine, 100 lbs. starch (N-DRIL ™ HT PLUS), 350 gal/1000 gal of HZ-10 ™ polymer, 60 gal/1000 gal HZ-20 ™ crosslinker |
| 5 | 7% KCl Brine, 45 lbs. starch (N-DRIL ™ HT PLUS), 20 lbs. diutan composition (FDP-848), 350 gal/1000 gal of HZ-10 ™ polymer, 60 gal/1000 gal HZ-20 ™ crosslinker |
| 6 | 7% KCl Brine, 45 lbs. starch (N-DRIL ™ HT PLUS), 20 lbs. diutan composition (FDP-848), 50 lbs. calcium carbonate (BARACARB ® 5), 350 gal/1000 gal of HZ-10 ™ polymer, 60 gal/1000 gal HZ-20 ™ crosslinker |
| 7 | 7% KCl Brine, 50 lbs. calcium carbonate (BARACARB ® 5), 25 lbs. diutan composition (FDP-848), 350 gal/1000 gal of HZ-10 ™ polymer, 60 gal/1000 gal HZ-20 ™ crosslinker |
| 8 | 7% KCl Brine, 50 lbs. Silica Flour, 25 lbs. diutan composition (FDP-848), 350 gal/1000 gal of HZ-10 ™ polymer, 60 gal/1000 gal HZ-20 ™ crosslinker |

Figure 2:
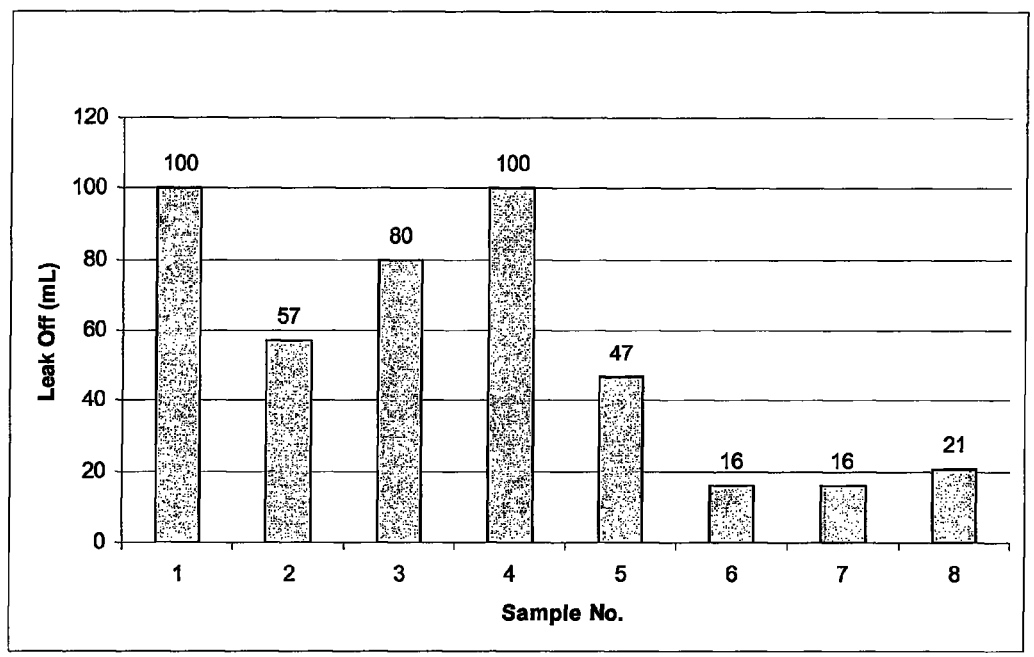
FIG. 2 is a graph of data discussed in the Examples section.

Each of the eight samples were individually tested in the following manner: After assembling the cell with the ceramic disk, a sample was added to the cell. The top cap was then put into place and heat was applied to the cell until the temperature reached 158° F. Then, using pressurized nitrogen, 500 psi pressure was applied to the top of the cell. The valve on the bottom of the cell was then opened, allowing filtrate to drain from the cell. Filtrate was collected for approximately ten minutes, or until all of the same had drained out, whichever came first. The results are detailed in FIG. 2.

Example 3

Fluid loss control tests were performed on six sample fluids at 190° F. using a Fann model number 38850 double ended filter cell. The cell was fitted on one end with a 5 micron aloxite disk as the filter medium. One inch of sand was placed on top of the aloxite disk to simulate a gravel packed well. The size of the sand used for each sample, as well as the composition of the six samples, is given below in Table 3.

TABLE 3

| Fluid No. | Sand Size (Mesh) | Fluid Composition |
| --- | --- | --- |
| 1 | 20/40 | 7% KCl Brine, 333 lbs. starch (N-DRIL ™ HT PLUS), 350 gal/1000 gal of HZ-10 ™ polymer, 40 gal/1000 gal HZ-20 ™ crosslinker |
| 2 | 20/40 | 7% KCl Brine, 333 lbs. starch (N-DRIL ™ HT PLUS), 350 gal/1000 gal of HZ-10 ™ polymer, 40 gal/1000 gal HZ-20 ™ crosslinker (repeat) |
| 3 | 30/50 | 7% KCl Brine, 333 lbs. starch (N-DRIL ™ HT PLUS), 350 gal/1000 gal of HZ-10 ™ polymer, 40 gal/1000 gal HZ-20 ™ crosslinker |
| 4 | 12/20 | 7% KCl Brine, 333 lbs. starch (N-DRIL ™ HT PLUS), 350 gal/1000 gal of HZ-10 ™ polymer, 40 gal/1000 gal HZ-20 ™ crosslinker |
| 5 | 20/40 | 7% KCl Brine, 90 lbs. starch (N-DRIL ™ HT PLUS), 20 lbs. diutan composition (FDP-848), 350 gal/1000 gal of HZ-10 ™ polymer, 40 gal/1000 gal HZ-20 ™ crosslinker |
| 6 | 12/20 | 7% KCl Brine, 90 lbs. starch (N-DRIL ™ UT PLUS), 20 lbs. diutan composition (FDP-848), 350 gal/1000 gal of HZ-10 ™ polymer, 40 gal/1000 gal HZ-20 ™ crosslinker |

Figure 3:
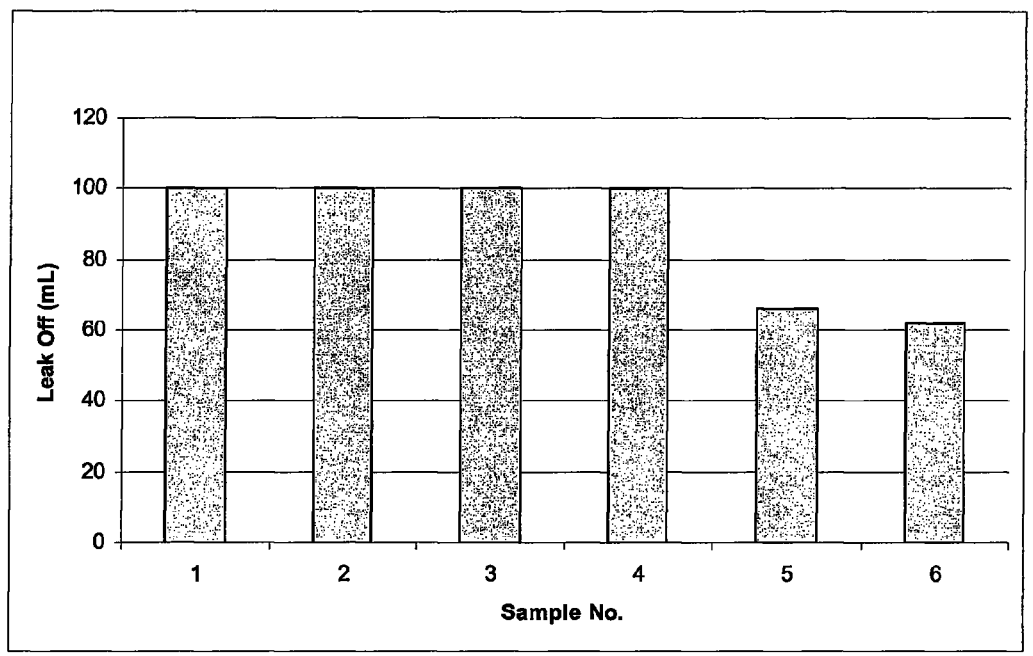
FIG. 3 is a graph of data discussed in the Examples section.

Each of the six samples were individually tested in the following manner: After assembling the cell with the aloxite disk and placing the sand on top of the disk, a sample was added to the cell. The top cap was then put into place and heat was applied to the cell until the temperature reached 190° F. Then, using pressurized nitrogen, 500 psi pressure was applied to the top of the cell. The valve on the bottom of the cell was then opened, allowing filtrate to drain from the cell. Filtrate was collected for approximately ten minutes, or until all of the same had drained out, whichever came first. The results are detailed in FIG. 3.

Thus, Examples 1-3 illustrate that the sealant compositions of the present invention may be used for effective fluid loss control.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a sealant composition comprising an aqueous fluid, a diutan composition, at least one gel system, and a leak off prevention material; wherein the diutan is present in an amount of at least about 20 lbs per 1000 gallons of the sealant composition and the leak off prevention material is present in an amount of about 50% or less by weight of the sealant composition;
introducing the sealant composition into a well bore penetrating the subterranean formation; and
allowing the sealant composition to form a seal.

2. The method of claim 1 wherein the diutan composition is present in the sealant composition in an amount of about 1 lb/1000 gallons to about 75 lb/1000 gallons.

3. The method of claim 1 wherein the gel system comprises one or more cross-linkable materials.

4. The method of claim 3 wherein the cross-linkable materials comprise at least one cross-linkable material selected from the group consisting of: a water-soluble copolymer of a non-acidic ethylenically unsaturated polar monomer and a copolymerizable ethylenically unsaturated ester; a terpolymer or tetrapolymer of an ethylenically unsaturated polar monomer, an ethylenically unsaturated ester, and a monomer selected from 2-acrylamido-2-methylpropane sulfonic acid, N-vinylpyrrolidone, or both; and a combination thereof.

5. The method of claim 1 wherein the gel system comprises a cross-linking agent comprising polyethylene imine.

6. The method of claim 1 wherein the gel system comprises at least one polymer selected from the group consisting of polyacrylamide, a sulfonated styrene/maleic anhydride copolymer, a vinylpyrrolidone/AMPS/acrylamide terpolymer, an AMPS/N—N-dimethylacrylamide/acrylamide terpolymer, a polyketone, an oxidized polyvinyl alcohol, and a combination thereof.

7. The method of claim 1 wherein the gel system comprises a high-density aqueous salt solution, a water-soluble polymerizable monomer and a polymerization initiator.

8. The method of claim 1 wherein the gel system comprises water, an oxidized chitosan-based compound and a water-soluble compound having carbonyl groups.

9. The method of claim 1 wherein the gel system comprises water, an amine-based polymer, a polysaccharide-based polymer and an oxidizing agent.

10. The method of claim 1 wherein the gel system comprises an aqueous fluid, chitosan, a polymer capable of reacting with chitosan and a gelation retarding additive.

11. The method of claim 1 wherein the gel system comprises polyacrylamide and a cross-linking agent comprising chromium.

12. The method of claim 1 wherein the gel system comprises colloidal silica.

13. The method of claim 1 wherein the leak off prevention material comprises at least one particulate material selected from the group consisting of cement, sand, silica flour, gilsonite, graphite; a fibrous material, a flaky material, a granular material and a combination thereof.

14. The method of claim 1 wherein the leak off prevention material comprises at least one water-soluble material selected from the group consisting of a starch, a starch mixture, a pre-gelatinized starch, a chemically modified starch, a naturally occurring starch and a combination thereof.

15. The method of claim 1 wherein the leak off prevention material comprises at least one water-soluble material comprising a hydrophobically modified polymer.

16. A method comprising:
providing a sealant composition comprising an aqueous fluid, a diutan composition, at least one gel system comprising a polyethylene imine cross-linking agent, and a leak off prevention material; wherein the diutan is present in an amount of at least about 20 lbs/1000 gallons of the sealant composition and the leak off prevention material is present in an amount of about 50% or less by weight of the sealant composition;
introducing the sealant composition into a well bore penetrating the subterranean formation; and
allowing the sealant composition to form a seal.

17. The method of claim 16 wherein the gel system comprises at least one cross-linkable material selected from the group consisting of: a water-soluble copolymer of a non-acidic ethylenically unsaturated polar monomer and a copolymerizable ethylenically unsaturated ester; a terpolymer or tetrapolymer of an ethylenically unsaturated polar monomer, an ethylenically unsaturated ester, and a monomer selected from 2-acrylamido-2-methylpropane sulfonic acid, N-vinylpyrrolidone, or both; and a combination thereof.

18. The method of claim 16 wherein the leak off prevention material comprises at least one particulate material selected from the group consisting of cement, sand, silica flour, gilsonite, graphite; a fibrous material, a flaky material, a granular material and a combination thereof.

19. The method of claim 16 wherein the leak off prevention material comprises at least one water-soluble material selected from the group consisting of a starch, a starch mixture, a pre-gelatinized starch, a chemically modified starch, a naturally occurring starch and a combination thereof.

20. The method of claim 16 wherein the leak off prevention material comprises at least one water-soluble material comprising a hydrophobically modified polymer.

* * * * *